United States Patent
Chiu et al.

(10) Patent No.: US 9,169,373 B2
(45) Date of Patent: *Oct. 27, 2015

(54) METHOD FOR PREPARING A THERMOPLASTIC POLYURETHANE OF IMPROVED YELLOWNESS INDEX, AND OPTICAL ARTICLES MADE THEREFROM

(75) Inventors: Hao-Wen Chiu, St. Petersburg, FL (US); Zeming Gou, St. Petersburg, FL (US)

(73) Assignee: Essilor International (Compagnie générale d'Optique) (FR)

( * ) Notice: Subject to any disclaimer, the term of this patent is extended or adjusted under 35 U.S.C. 154(b) by 67 days.

This patent is subject to a terminal disclaimer.

(21) Appl. No.: 13/700,362

(22) PCT Filed: May 27, 2010

(86) PCT No.: PCT/US2010/001599
§ 371 (c)(1),
(2), (4) Date: Jan. 11, 2013

(87) PCT Pub. No.: WO2011/149445
PCT Pub. Date: Dec. 1, 2011

(65) Prior Publication Data
US 2013/0201441 A1    Aug. 8, 2013

(51) Int. Cl.
*C08G 18/08* (2006.01)
*C08K 5/18* (2006.01)
(Continued)

(52) U.S. Cl.
CPC . *C08K 5/18* (2013.01); *C08K 5/005* (2013.01); *C08K 5/03* (2013.01); *C08K 5/3435* (2013.01); *C08K 5/3475* (2013.01); *G02B 1/04* (2013.01); *G02B 1/041* (2013.01); *G02B 1/043* (2013.01);
(Continued)

(58) Field of Classification Search
CPC .... C08G 18/0838; C08G 18/838; G02B 1/04; C08K 5/03
USPC .......................................................... 528/48
See application file for complete search history.

(56) References Cited

U.S. PATENT DOCUMENTS

| 4,639,502 A | 1/1987 | Muller et al. |
| 5,627,254 A | 5/1997 | Oriani |

(Continued)

FOREIGN PATENT DOCUMENTS

| CN | 1217001 A | 5/1999 |
| CN | 101516945 A | 8/2009 |

(Continued)

OTHER PUBLICATIONS

Morplas Dyes for Plastics and Fibers. http://www.sunbeltcolors.com/pdf/MorplasBrochure.pdf, 2004.*

(Continued)

*Primary Examiner* — Michael L Leonard
(74) *Attorney, Agent, or Firm* — Lerner, David, Littenberg, Krumholz & Mentlik, LLP

(57) ABSTRACT

Method for converting a composition into thermoplastic polyurethane, said composition comprising polyurethane resin, said method comprising the steps of combining the composition with a chemical compound, and converting said mixture into thermoplastic polyurethane, characterized in that said chemical compound is 1,4-Di(2,6-dibromo-4-methylphenylamino)anthracene-9,10-dione. Article obtained according to this method.

11 Claims, 1 Drawing Sheet

(51) Int. Cl.
*G02B 1/04* (2006.01)
*C08K 5/03* (2006.01)
*C08K 5/00* (2006.01)
*C08K 5/3435* (2006.01)
*C08K 5/3475* (2006.01)
*G02C 7/02* (2006.01)
*C08G 18/83* (2006.01)

(52) U.S. Cl.
CPC ............ *G02C 7/022* (2013.01); *C08G 18/0838* (2013.01); *C08G 18/838* (2013.01)

(56) References Cited

U.S. PATENT DOCUMENTS

| | | | |
|---|---|---|---|
| 5,679,756 A | * | 10/1997 | Zhu et al. .................... 528/65 |
| 5,785,916 A | * | 7/1998 | Huarng .................... 264/331.13 |
| 7,247,658 B2 | | 7/2007 | Ragsdale et al. |
| 2005/0191941 A1 | * | 9/2005 | Radford et al. ................. 450/57 |
| 2008/0246187 A1 | * | 10/2008 | Chiu et al. ................. 264/328.1 |

FOREIGN PATENT DOCUMENTS

| | | |
|---|---|---|
| EP | 0769527 A1 | 4/1997 |
| WO | 0105577 A2 | 1/2001 |
| WO | 02051911 A1 | 7/2002 |

OTHER PUBLICATIONS

International Search Report and Written Opinion, PCT/US2010/001599, Dated Jan. 31, 2011.

* cited by examiner

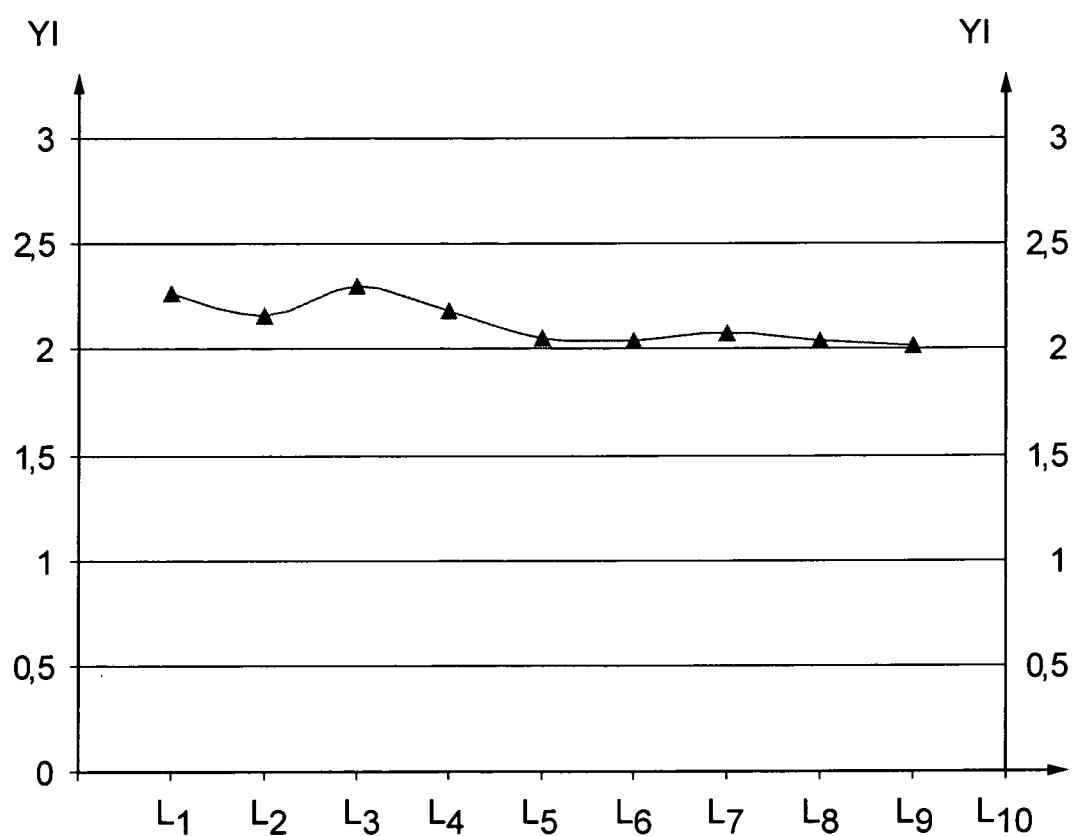

METHOD FOR PREPARING A THERMOPLASTIC POLYURETHANE OF IMPROVED YELLOWNESS INDEX, AND OPTICAL ARTICLES MADE THEREFROM

CROSS-REFERENCE OF RELATED APPLICATION

The present application is a national phase entry under 35 U.S.C. §371 of International Application No. PCT/US2010/001599 filed May 27, 2010, published in English, which is incorporated herein by reference.

BACKGROUND OF THE INVENTION

The present invention pertains to a method for converting a composition into thermoplastic polyurethane, said composition comprising polyurethane resin. The invention particularly concerns articles obtained by shaping the thermoplastic polyurethane obtained by this method. These articles are used as eyewear lenses such as sunwear, ophthalmic lenses, safety glasses, shields and goggles.

The material used to produce eyewear lenses must be optically clear. In addition, the finished product must meet specifications with regards to the color of the product. In particular, the color must remain stable during the life of the product. Certain materials, among them thermoplastic polyurethanes, are not suitable for use in eyewear applications due to a high initial Yellowness Index (YI) and/or due to an increasing YI because of its instability when exposed to UV radiation (e.g. from sunlight).

The rigid thermoplastic polyurethane resin ISOPLAST was first introduced and manufactured by Dow Chemical Company. In the ISOPLAST resin family, the commercially available thermoplastic polyurethane ISOPLAST® 301 produced by Lubrizol Advanced Materials is an injection molded transparent polyurethane derived from 4,4'-methylene diphenyldiisocyanate (MDI) and a mixture of 3 diols which are 1,6-hexanediol, 1,4-bis(hydroxymethyl)cyclohexane and polytetramethylene glycol. As the raw material MDI is pale yellow, the ISOPLAST® 301 resin is tinted with yellow with a measured Yellowness Index of 6 for a 3.2 mm thick injection molded sample based on ASTM D 1925. Thus ISOPLAST® 301 has both a high initial YI and an increasing YI as a function of time.

Nevertheless, in view of its high toughness and its chemical resistance, this material ISOPLAST® 301 material would be of interest for use in eyewear applications, if it were transparent.

There is therefore a need for a method for producing thermoplastic polyurethane such as ISOPLAST® 301, which can be used in eyewear applications, overcoming the limitations of the known thermoplastic polyurethanes, without compromising its other optical and mechanical properties. Advantageously the present invention discloses a method that addresses the issues discussed above. These and other advantages are achieved in accordance with the present invention as described below.

BRIEF SUMMARY OF THE INVENTION

The invention provides a method for converting a composition into thermoplastic polyurethane, said composition comprising polyurethane resin, said method comprising the step of combining the composition with a chemical compound, and the step of converting said mixture into thermoplastic polyurethane, said method being characterized in that said chemical compound is 1,4-Di(2,6-dibromo-4-methylphenylamino)anthracene-9,10-dione.

BRIEF DESCRIPTION OF THE DRAWINGS

FIG. 1 is a diagram showing a curve of measurements of the Yellowness Index (YI) with respect to ten consecutively molded lenses $L_1$ to $L_{10}$. It is more fully explained in the context of the examples.

DETAILED DESCRIPTION

The polyurethane resin of the composition according to the invention is usually either a polymerizable composition comprising precursors of thermoplastic polyurethane, or pellets and/or powder made of thermoplastic polyurethane which is not light-stabilized (i.e. which does not include any additive—such as colorant or stabilizer—in order to improve the YI).

When the thermoplastic polyurethane is a thermoplastic aromatic based polyurethane, the precursors of said thermoplastic polyurethane are usually: at least one polyol, at least one chain extender, and at least one aromatic isocyanate The compound "1,4-Di(2,6-dibromo-4-methylphenylamino) anthracene-9,10-dione" is represented by the molecular formula $C_{28}H_{18}Br_4N_2O_2$. It can be the commercial product sold by Pylam. This compound is a colorant of CAS No.: 68239-76-9. It can be found under the commercial names Pylakrome Blue Violet LX-10330, Solvent Violet 38 and Morplas Violet 3B.

Advantageously according to the invention, this colorant neutralizes the initial Yellowness Index of the thermoplastic polyurethane, that is to say that it lowers the initial Yellowness Index of the thermoplastic resin, in particular when said resin is of the ISOPLAST family, with or without any additive in it. Furthermore, this colorant is surprisingly thermally stable during the converting step into the thermoplastic polyurethane.

According to the invention, said composition can further comprise at least one additive. Said additive is preferably selected from the group of antioxidants and light stabilizers.

The additive(s) and the other components according to the invention can be incorporated in any combination or sequence with the composition, e.g. individually or together, or incorporated during any one of the combination step and the conversion step, or during both steps.

According to a particularly preferred embodiment, the composition further comprises benzenepropanoic acid, 3(1,1-dimethylethyl)-4-hydroxy-5-methyl-1,1'-[1,2-ethanediyl-bis(oxy-2,1-ethanediyl)]ester; bis(1,2,2,6,6-pentamethyl-4-piperidinyl)-[[3,5-bis(1,1-dimethylethyl)-4-hydroxyphenyl]methyl]butylmalonate; together with at least one component selected from the group of phenol, 2-(5-chloro-2H-benzotriazol-2-yl)-6-(1,1-dimethylethyl)-4-methyl and 2,2'-methylenebis(6-(2H-benzotriazol-2-yl)-4-1,1,3,3-tetramethylbutyl)phenol), wherein phenol, 2-(5-chloro-2H-benzotriazol-2-yl)-6-(1,1-dimethylethyl)-4-methyl is preferably present.

Advantageously according to the invention, the combination of these specific stabilizing additives (that is to say an antioxidant and two light stabilizers), for example at the level of approximately 0.33% by weight of each additive, and of 1,4-Di(2,6-dibromo-4-methylphenylamino)anthracene-9,10-dione, neutralizes the initial Yellowness Index of the thermoplastic polyurethane surprisingly even in the presence of these, additive(s) which have a rather high Yellowness Index by themselves.

The compound "benzenepropanoic acid, 3(1,1-dimethylethyl)-4-hydroxy-5-methyl-1,1'-[1,2-ethanediylbis(oxy-2,1-ethanediyl)]ester" can be the commercial product sold by the Ciba subsidiary of BASF, Irganox® 245. Irganox® 245 is a hindered phenolic antioxidant with a CAS No of 36443-68-2.

The compound "bis(1,2,2,6,6-pentamethyl-4-piperidinyl)-[[3,5-bis(1,1-dimethylethyl)-4-hydroxyphenyl]methyl]butylmalonate" can be the commercial product sold by the Ciba subsidiary of BASF, Tinuvin® 144. This compound has the CAS No 63843-89-0. It is a Hindered Amine Light Stabilizer (or HALS).

The compound "phenol, 2-(5-chloro-2H-benzotriazol-2-yl)-6-(1,1-dimethylethyl)-4-methyl" can be the commercial product sold by the Ciba subsidiary of BASF, Tinuvin® 326. This compound has the CAS No 3896-11-5. It is an Ultraviolet Absorbent (or UVA).

The compound "2,2'-methylenebis(6-(2H-benzotriazol-2-yl)-4-1,1,3,3-tetramethylbutyl)phenol)" can be the commercial product sold by the Ciba subsidiary of BASF, Tinuvine 360. This compound has the CAS No 103597-45-1. It is an Ultraviolet Absorbent (or UVA).

According to an embodiment of the invention, the content of 1,4-Di(2,6-dibromo-4-methylphenylamino)anthracene-9,10-dione lies in the range from 1 to 20 ppm, preferably from 5 to 10 ppm (by weight). The amount of the colorant depends generally on whether at least another additive such as UV absorber, antioxidant, and/or HALS has been added to the resin.

Preferably, the combining step is carried out according to a dry blending method or a master batch method, but any other method known to the one skilled in the art can be used.

Preferably, the converting step is carried out according to an injection molding method or an extrusion method, and the converting step is more preferably carried out according to an injection molding method, as known to the one skilled in the art.

When the converting step is carried out according to an extrusion method, the converting step is usually followed by the step of forming an article, preferably a lens, from the thermoplastic polyurethane.

The lens is generally transformed into an ophthalmic lens by suitable shaping, as known by the one skilled in the art. The shaping comprises usually steps of grinding, fining and polishing.

The polyurethane resin is preferably a commercially available product. Alternatively it can be manufactured just before or during the converting step. It is usually in the form of pellets and/or powder.

According to the invention, the polyurethane resin is preferably one of the commercial products sold by Lubrizol Advanced Materials preferably from the ISOPLAST® family such as ISOPLAST® 301, ISOPLAST® 2530 and ISOPLAST® 2531, and the polyurethane resin is more preferably ISOPLAST® 301.

The invention also relates to the thermoplastic polyurethane obtained according to this method. Said thermoplastic polyurethane is "light-stabilized".

The invention also concerns any article, preferably an ophthalmic lens, formed by the step of shaping the thermoplastic polyurethane obtained according to the method for the invention.

This article is generally used alone or as part of a product or a device, where light passes through the article, and the light passing through the article will be detected by eyes or by a device for detecting the quality or other properties of the light.

More preferably, the article is used as eyewear lenses such as in sunwear, ophthalmic lenses, safety glasses, shields and goggles.

The article, in the sense of the present invention, should be understood to mean an uncoated article. The article may in particular be an optically transparent material having the shape of an optical article.

Said article can further comprise a coating over at least one portion of a surface of the article. Said article is advantageously coated with coatings conventionally used in the ophthalmic optics field, such as anti-abrasion coatings, scratch-resistant coatings or anti-reflection coatings.

The invention thus also relates to said article further comprising a coating over at least one portion of a surface of the article.

According to a preferred embodiment, the article has a Yellowness Index which does not increase by more than 4.0, preferably of more than 2.5, over 200 hours in Suntest Thus the use of the colorant according to the invention surprisingly neutralizes the initial Yellowness Index of the thermoplastic polyurethane while keeping the stability of the thermoplastic polyurethane over 200 hours Suntest as if the thermoplastic polyurethane did not comprise said colorant.

The Suntest is a test as described. This test involves an exposure of a plano test sample with a thickness of 2.0 mm, for 200 hours, of a xenon lamp (60+/–6 Klux, by suitable adjustment of the equipment's irradiance, measured in units of $Wcm^{-2}$). A hard coating (polysiloxane based anti-abrasion coating), is carried out on this sample just before the Suntest. Filters are providing full day light spectrum from 295 to 780 nm (coated quartz glass/special UV glass/reflecting mirror UV/light).

The Yellowness Index is measured according to ASTM D 1925.

According to the invention, the colorant has an excellent thermal stability during high temperature molding processes, which can be readily understood by considering the accompanying drawing:

FIG. 1 is a diagram showing a curve of measurements of the Yellowness Index (YI) with respect to ten consecutively molded lenses $L_1$ to $L_{10}$.

FIG. 1 is explained in the following examples.

The invention is further illustrated by the following non-limiting examples which are given for illustrative purposes only.

EXAMPLES

In all the examples, the polyurethane resin is the commercially available compound ISOPLAST® 301 provided by the company Lubrizol Advanced Materials and 1,4-Di(2,6-dibromo-4-methylphenylamino) anthracene-9,10-dione will be referred to as the "1,4" colorant.

Example 1

ISOPLAST® 301 resin (in the form of pellets) was dried at 100° C. for 4 hours so that the moisture level is below 100 ppm.

No colorant or a predetermined amount of "1,4" colorant (2.5 ppm) of the invention was added to the warm ISOPLAST® 301 resin just after drying. The resin pellets were then mixed (combined) by dry blending.

The thus obtained two different mixtures (one with no colorant and the other containing the 1,4 colorant) were separately injection molded into 2 mm thick 6-base plano lenses using a 110-ton Cincinnati Roboshot molding machine equipped with a 2-cavity mold.

Key molding process parameters are as follows:

Melt temperature: 480° F. (248.9° C.)

Mold temperature: 230° F. (thermolater set temperature) (110.0° C.)

Injection speed: 1.2 ips (inch per second) (30.48 mm/s)—one step

Shot size: 1.75 inch (44.45 mm)

Hold pressure: 6,000 psi (41.37 MPa)—5 s; 4,000 psi (27.59 MPa)—3 s; 2,000 psi (13.79 MPa)—2 s; 1,000 psi (6.89 MPa)—2 s Cool time: 80 sec Inserts: 76 mm 6-base steel inserts.

Two plano lenses with a center thickness of 2 mm, were then produced and sent to measure Yellowness Index and luminous transmittance using Lambda 900. The Yellowness Index and luminous transmittance results of the injection molded lenses are shown in Table 1. It is seen that the "1,4" colorant gives a low Yellowness Index of approximately 1 while maintaining a high luminous transmittance of 88.02%.

TABLE 1

Yellowness Index and luminous transmittance results for Example 1

|  | Yellowness Index | Luminous Transmittance (%) |
|---|---|---|
| "1,4" Colorant 2.5 ppm | 1.04 | 88.02 |
| No Colorant | 2.46 | 89.59 |

Example 2

ISOPLAST 301 resin was dried in the same way as in Example 1. In addition to a predetermined amount of the "1,4" colorant, 0.33 wt % antioxidant (Ciba Irganox® 245), 0.33 wt % UV absorber (Ciba Tinuvin® 326) and 0.33 wt % HALS (Ciba Tinuvin® 144) were added to the warm dried resin. The mixtures were mixed (combined) using the dry blending method before injection molding. The molding conditions and Yellowness Index measurement are all same as those in Example 1. The Yellowness Index and luminous transmittance measurement results are shown in Table 2.

TABLE 2

Yellowness index measurement results for Example

| "1,4" Colorant Concentration (ppm) | Yellowness Index | Luminous Transmittance (%) |
|---|---|---|
| 0 | 6.57 | 89.24 |
| 6 | 3.77 | 85.65 |
| 8 | 2.12 | 85.51 |
| 10 | 1.08 | 84.21 |

It can be seen that the Yellowness Index of the molded lenses can be effectively lowered by addition of high concentration of "1,4" colorant, which, however, can impair the luminous transmittance as well. The optimal concentration of "1,4" colorant to be chosen by the one skilled in the art usually depends on the target product's specification as a result of the compromise between Yellowness Index and luminous transmittance.

Example 3

ISOPLAST 301 resin was dried in the same way as in Example 1. A predetermined amount (8 ppm) of the "1,4" colorant was added to the warm dried resin. In addition to the "1,4" colorant, 0.33 wt % antioxidant (Ciba Irganox® 245), 0.33 wt % UV absorber (Ciba Tinuvin® 326) and 0.33 wt % HALS (Ciba Tinuvin® 144) were also added to the warm dried resin. The mixture was mixed (combined) using the dry blending method before injection molding. The molding conditions and Yellowness Index measurement are all same as those in Example 1. The Yellowness Index and luminous transmittance measurement results are shown in FIG. 1.

In the molding process of the resin prepared in the above manner, ten consecutively-molded lenses were collected and labeled as $L_1$, $L_2$, $L_3$, $L_4$, $L_5$, $L_6$, $L_7$, $L_8$, $L_9$ and $L_{10}$.

FIG. 1 shows the Yellowness Indexes of the consecutive lenses $L_1$, $L_2$, $L_3$, $L_4$, $L_5$, $L_6$, $L_7$, $L_8$, $L_9$ and $L_{10}$.

It can be seen that the Yellowness Index approaches a stable value. This suggests the excellent stability of the "1,4" colorant during high temperature molding process.

Example 4

A ISOPLAST 301 resin was custom-made in the commercial resin manufacturing process with addition of 0.33 wt % antioxidant (Ciba Irganox 245), 0.33 wt % UV absorber (Ciba Tinuvin 326) and 0.33 wt % HALS (Ciba Tinuvin 144). A predetermined amount of "1,4" colorant was mixed well with the dried resin. The mixture was molded in the same conditions as that in Example 1. The Yellowness Index and luminous transmittance measurement results are shown in Table 3.

TABLE 3

Yellowness Index measurement results for Example

| "1,4" Colorant Concentration (ppm) | Yellowness Index | Luminous Transmittance (%) |
|---|---|---|
| 0 | 9.56 | 89.13 |
| 6 | 5.51 | 86.41 |
| 8 | 4.04 | 85.60 |
| 10 | 2.81 | 84.77 |

Again, the optimal concentration of "1,4" colorant to be chosen by the one skilled in the art is subject to the target product's specification as a result of the compromise between Yellowness Index and luminous transmittance.

Example 5

Two batches of ISOPLAST 301 resin were prepared in a manner similar to that in the previous example four (one without any colorant, and the other with 10 ppm of "1,4" colorant), and 2.00 mm thick plano lenses were injection molded from these two batches of resin separately. Four lenses (two for each batch) are measured for YI during the 200 hours Suntest.

The results of the measurements are given in Table 4 below, the comparative examples being given in the second and third column of this Table, and the examples according to the invention being given in the fourth and fifth columns of this Table.

TABLE 4

Suntest measurement results for Example 5

|  | No colorant | | With 10 ppm "1,4" colorant | |
|---|---|---|---|---|
|  | Lens 1 | Lens 2 | Lens 3 | Lens 4 |
| Before Suntest | 9.99 | 9.76 | 2.31 | 2.57 |
| 50 hours | 10.22 | 10.11 | 2.51 | 2.87 |
| 100 hours | 10.72 | 10.58 | 3.14 | 3.38 |
| 150 hours | 11.63 | 11.75 | 3.97 | 4.23 |
| 200 hours: Suntest | 12.39 | 12.04 | 4.73 | 4.76 |
| Delta YI | 2.40 | 2.28 | 2.42 | 2.19 |

The data clearly shows that the use of the colorant according to the invention give similar results in terms of low increase in YI over 200 hours Suntest (2.42 and 2.19 with respect to 2.40 and 2.28), while allowing the initial YI of the lenses with colorants to be low. The use of the colorant neutralizes the Yellowness Index of the thermoplastic polyurethane lenses while keeping the stability of the lenses over 200 hours Suntest.

The invention claimed is:

1. A method of forming an ophthalmic lens from a composition including polyurethane resin, comprising the steps of:
    combining the composition with 1,4-Di(2,6-dibromo-4-methylphenylamino)anthracene-9,10-dione to form a mixture;
    converting said mixture into a thermoplastic polyurethane; and
    shaping the obtained thermoplastic polyurethane into the ophthalmic lens,
    wherein the polyurethane resin is either a polymerizable composition comprising precursors of thermoplastic polyurethane, or pellets and/or powder made of thermoplastic polyurethane which is not light-stabilized, and wherein said obtained lens has a Yellowness Index that does not increase by more than 4.0 over a Suntest of over 200 hours.

2. The method according to claim 1, wherein said composition further comprises at least one additive.

3. The method according to claim 2, wherein said additive is selected from the group consisting of antioxidants and light stabilizers.

4. The method according to claim 2, wherein the composition further comprises benzenepropanoic acid, 3(1,1-dimethylethyl)-4-hydroxy-5-methyl-1,1'-[1,2-ethanediylbis(oxy-2,1-ethanediyl)]ester; bis(1,2,2,6,6-pentamethyl-4-piperidinyl)-[[3,5-bis(1,1-dimethylethyl)-4-hydroxyphenyl]methyl]butylmalonate; together with at least one component selected from the group consisting of phenol, 2-(5-chloro-2H-benzotriazol-2-yl)-6-(1,1-dimethylethyl)-4-methyl and 2,2'-methylenebis(6-(2H-benzotriazol-2-yl)-4-1,1,3,3-tetramethylbutyl)phenol).

5. The method according to claim 1, wherein the content of 1,4-Di(2,6-dibromo-4-methylphenylamino)anthracene-9,10-dione lies in the range from 1 to 20 ppm (by weight).

6. The method according to claim 1, wherein the combining step is carried out according to a dry blending method or a master batch method.

7. The method according to claim 1, wherein the converting step is carried out according to an injection molding method or an extrusion method.

8. The method according to claim 1, wherein the polyurethane resin is derived from at least one of 4,4'-methylene diphenyldiisocyanate and a mixture of 3 diols which are 1,6-hexanediol, 1,4-bis(hydroxymethyl)cyclohexane and polytetramethylene glycol; and 4,4'-methylene diphenyldiisocyanate and 1,6-hexanediol.

9. The ophthalmic lens according to claim 1, wherein said lens further comprises a coating over at least one portion of a surface of the lens.

10. The method according to claim 5, wherein the range is from 5 to 10 ppm (by weight).

11. The ophthalmic lens according to claim 1, wherein the Yellowness Index does not increase by more than 2.5 over a Suntest of over 200 hours.

* * * * *